(12) United States Patent
Stelzer

(10) Patent No.: US 9,517,685 B2
(45) Date of Patent: Dec. 13, 2016

(54) PORTABLE VEHICLE PROTECTION DEVICE

(71) Applicant: Kathleen C. Stelzer, Oklahoma City, OK (US)

(72) Inventor: Kathleen C. Stelzer, Oklahoma City, OK (US)

( * ) Notice: Subject to any disclaimer, the term of this patent is extended or adjusted under 35 U.S.C. 154(b) by 121 days.

(21) Appl. No.: 14/490,376

(22) Filed: Sep. 18, 2014

(65) Prior Publication Data

US 2016/0082820 A1    Mar. 24, 2016

(51) Int. Cl.
 *B60J 11/04*    (2006.01)

(52) U.S. Cl.
 CPC ...................... *B60J 11/04* (2013.01)

(58) Field of Classification Search
 CPC ....................................... A60J 11/04
 USPC ..................... 150/166; 296/136.02
 See application file for complete search history.

(56) References Cited

U.S. PATENT DOCUMENTS

| | | | | |
|---|---|---|---|---|
| 1,728,437 A * | 9/1929 | Mott | ........................ | B60J 11/00 150/166 |
| 2,113,294 A * | 4/1938 | Dotten | ..................... | B60J 11/00 135/117 |
| 5,203,565 A * | 4/1993 | Murray | .................. | A63B 53/04 473/242 |
| 5,242,206 A | 9/1993 | Heck | | |
| 5,287,904 A * | 2/1994 | Smith | ...................... | B60J 11/00 150/166 |
| 5,664,825 A | 9/1997 | Henke et al. | | |
| D402,622 S | 12/1998 | Rogers | | |
| 5,890,525 A | 4/1999 | Shores | | |
| 6,044,881 A * | 4/2000 | Welch | ....................... | B60J 11/00 150/166 |
| 6,056,347 A * | 5/2000 | D'Adamo | ................. | B60J 11/00 296/136.02 |
| 7,100,965 B1 * | 9/2006 | Stover | ....................... | B60J 11/06 296/136.03 |
| 7,360,820 B2 | 4/2008 | Tellez | | |
| 7,640,698 B2 | 1/2010 | Graham | | |
| 8,985,672 B2 * | 3/2015 | Siciliano | ................... | B60J 11/04 296/136.02 |
| 2006/0043761 A1 * | 3/2006 | Harcourt | .................... | B60J 11/00 296/136.02 |
| 2006/0103165 A1 * | 5/2006 | Ward | ........................ | B60J 11/00 296/136.02 |
| 2007/0138829 A1 * | 6/2007 | Leyendecker | ........... | B60J 11/00 296/136.02 |
| 2007/0284023 A1 | 12/2007 | Sitarz | | |

(Continued)

*Primary Examiner* — Sue A Weaver

(57) ABSTRACT

A portable vehicle protection device provides a quickly deployed cover for a vehicle to protect against hail damage. The device includes an inflatable chamber. Each of a pair of side flaps is coupled to an associated longitudinal edge of the chamber. Each of a pair of end flaps is coupled to an associated end edge of the chamber. The chamber, the side flaps, and the end flaps define the cover. Each of a plurality of fasteners is coupled to a respective strap extending from one of the end flaps. Each strap is couplable to an associated one of the side flaps such that the chamber extends over a top surface of the vehicle. An inflation mechanism is coupled to the chamber and is in fluid communication with an interior of the chamber wherein the inflation mechanism selectively inflates the chamber upon actuation of the inflation mechanism.

10 Claims, 4 Drawing Sheets

(56) References Cited

U.S. PATENT DOCUMENTS

| | | | | |
|---|---|---|---|---|
| 2009/0108624 A1 | 4/2009 | Hunt | | |
| 2010/0326017 A1* | 12/2010 | Kindel | ..................... | B60J 11/00 |
| | | | | 53/461 |
| 2014/0015274 A1* | 1/2014 | Banda | ...................... | B60J 11/04 |
| | | | | 296/136.02 |

* cited by examiner

PORTABLE VEHICLE PROTECTION DEVICE

BACKGROUND OF THE DISCLOSURE

Field of the Disclosure

The disclosure relates to vehicle protection devices and more particularly pertains to a new vehicle protection device for providing a quickly deployed cover for a vehicle to protect against hail damage.

SUMMARY OF THE DISCLOSURE

An embodiment of the disclosure meets the needs presented above by generally comprising an inflatable chamber. Each of a pair of side flaps is coupled to an associated longitudinal edge of the chamber. Each of a pair of end flaps is coupled to an associated end edge of the chamber. The chamber, the side flaps, and the end flaps define the cover. Each of a plurality of fasteners is coupled to a respective strap extending from one of the end flaps. Each strap is couplable to an associated one of the side flaps such that the chamber extends over a top surface of the vehicle. An inflation mechanism is coupled to the chamber and is in fluid communication with an interior of the chamber wherein the inflation mechanism selectively inflates the chamber upon actuation of the inflation mechanism.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
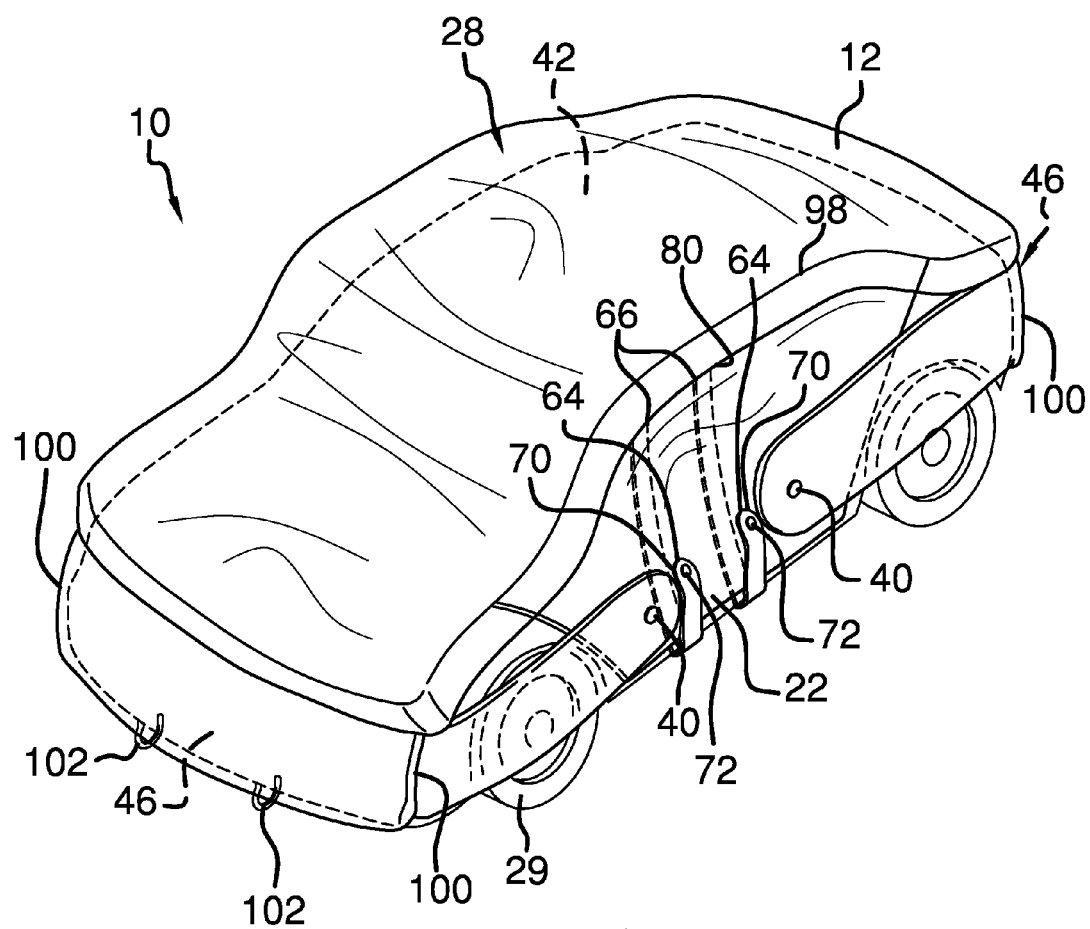
FIG. 1 is a top front side perspective view of a portable vehicle protection device according to an embodiment of the disclosure.
Figure 2:
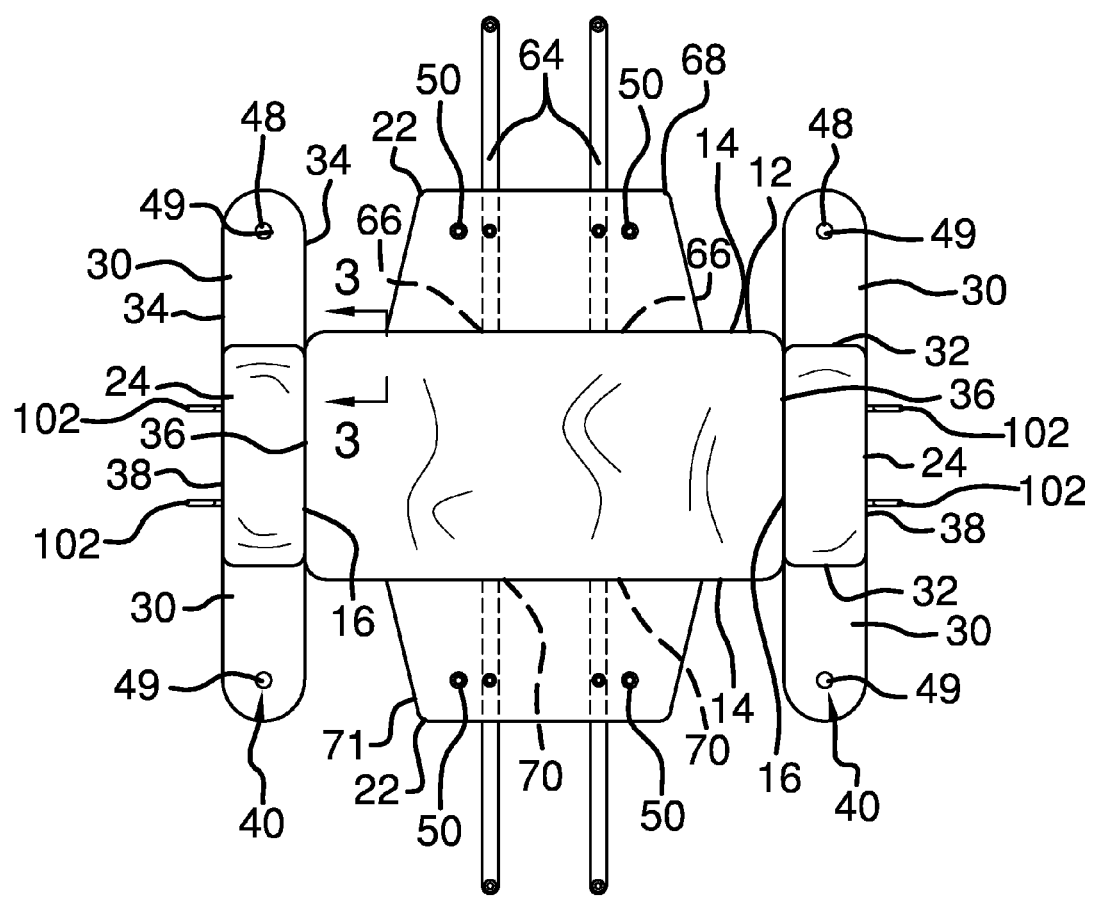
FIG. 2 is a top view of an embodiment of the disclosure.
Figure 3:
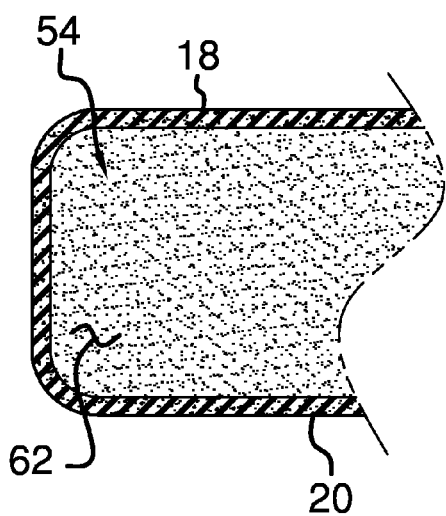
FIG. 3 is a cross-sectional view of an embodiment of the disclosure taken along line 3-3 of FIG. 2.
Figure 4:
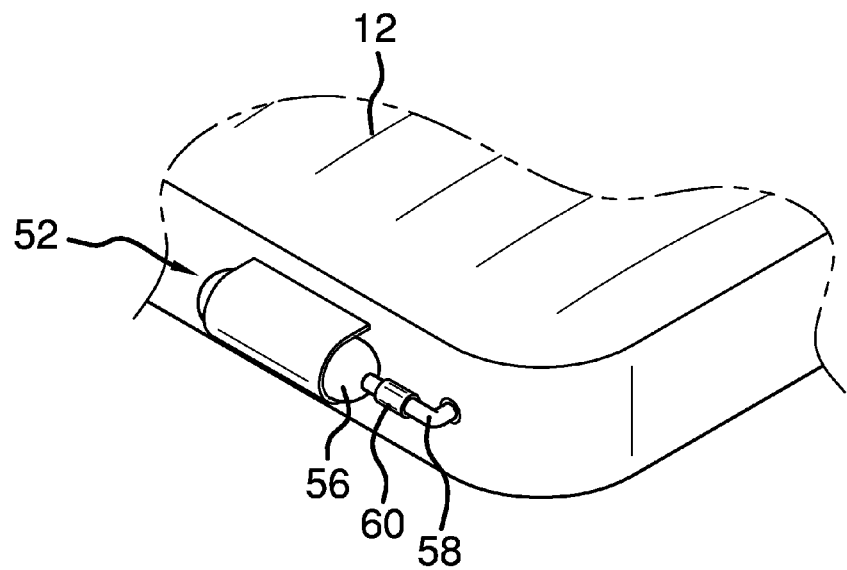
FIG. 4 is a detailed top rear side perspective view of an embodiment of the disclosure.
Figure 5:
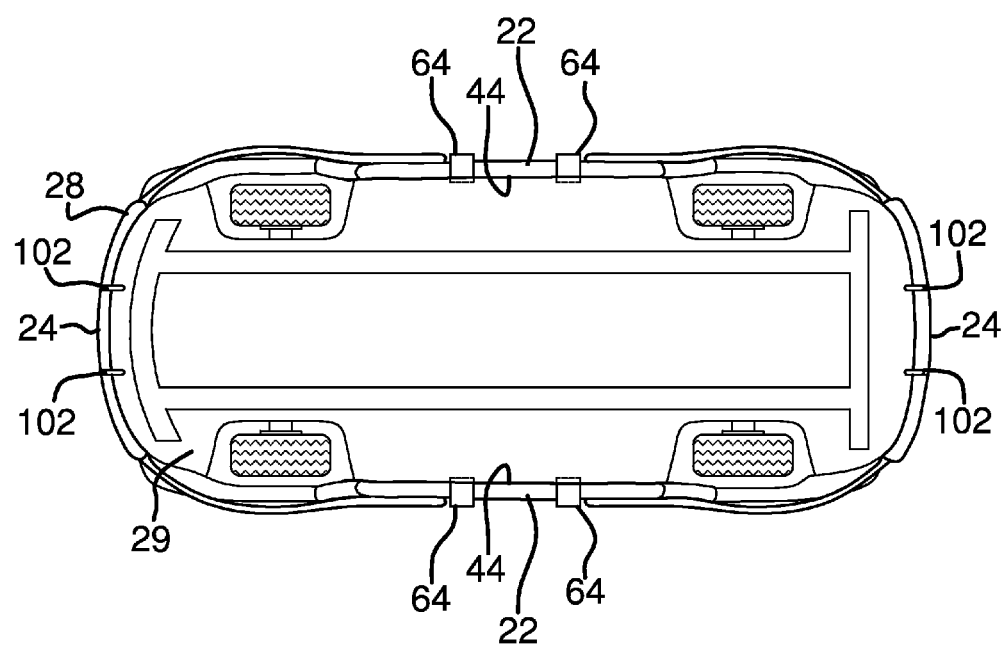
FIG. 5 is a bottom view of an embodiment of the disclosure in use.

With reference now to the drawings, and in particular to FIGS. 1 through 5 thereof, a new vehicle protection device embodying the principles and concepts of an embodiment of the disclosure and generally designated by the reference numeral 10 will be described.

As best illustrated in FIGS. 1 through 5, the portable vehicle protection device 10 generally comprises a chamber 12 having a pair of longitudinal edges 14 and a pair of opposed end edges 16 extending between the longitudinal edges 14. The chamber 12 is inflatable. A distance between a top face 18 and a bottom face 20 of the chamber 12 may be between approximately 10.0 centimeters and 18.0 centimeters when the chamber 12 is inflated. The chamber 12 is configured to be wider than a vehicle 29 upon which the chamber 12 is positioned.

A pair of side flaps 22 is provided. Each side flap 22 is coupled to and extends from an associated one of the longitudinal edges 14 of the chamber 12 at a top side 98 of the chamber 12. Each of the side flaps 22 is constructed of a resiliently compressible material, such as rubber or the like. A pair of end flaps 24 is provided. Each end flap 24 is coupled to and extends from an associated one of the end edges 16 of the chamber 12. Each of the chamber 12, the side flaps 22, and the end flaps 24 define a cover 28 configured for positioning over the vehicle 29. Each of the end flaps 24 is constructed of a resiliently compressible material, such as rubber or the like. The chamber 12 is structured to overhang relative to ends 100 of the end flaps 24. Hooks 102 may be provided on the end flaps 24 to facilitate engagement of the end flaps 24 to the vehicle 29.

A plurality of straps 30 is provided. Each of the straps 30 is coupled to and extends from a respective side 32 of an associated one of the end flaps 24. Each strap 30 has a width between longitudinal sides 34 of the strap 30. The width of each strap 30 may be equal to a width of the associated end flap 24 between a proximal edge 36 of the associated end flap 24 relative to the chamber 12 and a distal edge 38 of the associated end flap 24 relative to the chamber 12.

A plurality of fasteners 40 is provided. Each fastener 40 is coupled to an associated one of the straps 30 wherein each strap 30 is couplable to an associated one of the side flaps 22 wherein the straps 30 are configured for coupling the cover 28 to a vehicle 29 such that the chamber 12 extends over a top surface 42 of the vehicle 29, the side flaps 22 extend over lateral sides 44 of the vehicle 29, and the end flaps 24 extend over ends 46 of the vehicle 29. The fastener 40 may be a snap 49 or other conventional coupler having a first section 48 coupled to the associated strap 30 and a second section 50 complementary to the first section 48. The second section 50 of the snap 49 is coupled to the associated side flap 22.

An inflation mechanism 52 is coupled to the chamber 12. The inflation mechanism 52 is in fluid communication with an interior 54 of the chamber 12 wherein the inflation mechanism 52 selectively inflates the chamber 12 upon actuation of the inflation mechanism 52. The inflation mechanism 52 comprises a tank 56. A conduit 58 fluidly couples the tank 56 to the chamber 12. A valve 60 is coupled between the tank 56 and the chamber 12. The valve 60 is openable such that the tank 56 is in fluid communication with the chamber 12 through the conduit 58 wherein the tank 56 is configured for releasing pressurized gas 62, such as carbon dioxide or nitrogen gas, from the tank 56 into the chamber 12.

A pair of bands 64 is provided on each side. Each band 64 has a first end 66 coupled to the chamber 12 along a perimeter edge 80. Each band 64 is extendable down from the chamber 12 across a door opening of the vehicle 29. Closing a door of the vehicle 29 holds each band 64 such that a respective second end 70 of each band 64 is positionable back over an associated one of the side flaps 22. A connector 72 is coupled to each band 64 proximate the second end 70 to secure the second end 70 to the associated side flap 22.

In use, as stated above and shown in the Figures, the cover 28 is positioned onto the vehicle 29 as described above. The fasteners 40 are used to couple the cover 28 to the vehicle 29. The bands 64 are inserted through an interior of the vehicle 29 through open doors of the vehicle 29. The doors are then closed on the bands 64 to couple the bands 64 to the vehicle 29. The valve 60 is opened to release pressurized gas 62 to inflate the chamber 12 and protect the vehicle 29 against hail damage when needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable vehicle protection device comprising:
   a chamber having a pair of longitudinal edges and a pair of opposed end edges extending between said longitudinal edges, said chamber being inflatable;
   a pair of side flaps, each said side flap being coupled to and extending from an associated one of said longitudinal edges of said chamber;
   a pair of end flaps, each said end flap being coupled to and extending from an associated one of said end edges of said chamber, said chamber, said side flaps, and said end flaps defining a cover configured for positioning over a vehicle;
   a plurality of straps, each of said straps being coupled to and extending from a respective side of an associated one of said end flaps;
   a plurality of fasteners, each fastener being coupled to an associated one of said straps wherein each said strap is couplable to an associated one of said side flaps wherein said straps are configured for coupling said cover to a vehicle such that said chamber extends over a top surface of the vehicle, said side flaps extend over lateral sides of the vehicle, and said end flaps extend over ends of the vehicle;
   an inflation mechanism coupled to said chamber, said inflation mechanism being in fluid communication with an interior of said chamber wherein said inflation mechanism selectively inflates said chamber upon actuation of said inflation mechanism; and
   each said strap having a width between longitudinal sides of said strap, said width of each said strap being equal to a width of said associated end flap between a proximal edge of said associated end flap relative to said chamber and a distal edge of said associated end flap relative to said chamber.

2. The device of claim 1, further comprising a band having a first end coupled to said chamber such that said band is configured for extending across and being closed into a door opening of the vehicle whereby said band couples said cover to the vehicle.

3. The device of claim 2, further comprising a second end of said band being couplable to an associated one of said side flaps.

4. The device of claim 3, further comprising a connector coupled to said band and said associated side flap wherein said second end of said band is couplable to said associated side flap.

5. The device of claim 1, further comprising said inflation mechanism comprising a tank, a conduit fluidly coupling said tank to said chamber, and a valve coupled between said tank and said chamber, said valve being openable such that said tank is in fluid communication with said chamber through said conduit wherein said tank is configured for releasing pressurized gas from said tank into said chamber.

6. The device of claim 1, further comprising each said fastener being a snap having a first section coupled to said associated strap and a second section complementary to said first section, said second section of said snap being coupled to said associated side flap.

7. The device of claim 1, further comprising a distance between a top face and a bottom face of said chamber being between 10 and 18 centimeters when said chamber is inflated.

8. The device of claim 1, further comprising said end flaps being constructed of a resiliently compressible material.

9. The device of claim 1, further comprising said side flaps being constructed of a resiliently compressible material.

10. A portable vehicle protection device comprising:
    a chamber having a pair of longitudinal edges and a pair of opposed end edges extending between said longitudinal edges, said chamber being inflatable, a distance between a top face and a bottom face of said chamber being between 10 and 18 centimeters when said chamber is inflated;
    a pair of side flaps, each said side flap being coupled to and extending from an associated one of said longitudinal edges of said chamber, each of said side flaps being constructed of a resiliently compressible material;
    a pair of end flaps, each said end flap being coupled to and extending from an associated one of said end edges of said chamber, said chamber, said side flaps, and said end flaps defining a cover configured for positioning over a vehicle, each of said end flaps being constructed of a resiliently compressible material;
    a plurality of straps, each of said straps being coupled to and extending from a respective side of an associated one of said end flaps, each said strap having a width between longitudinal sides of said strap, said width of each said strap being equal to a width of said associated end flap between a proximal edge of said associated end flap relative to said chamber and a distal edge of said associated end flap relative to said chamber;
    a plurality of fasteners, each fastener being coupled to an associated one of said straps wherein each said strap is couplable to an associated one of said side flaps wherein said straps are configured for coupling said cover to a vehicle such that said chamber extends over a top surface of the vehicle, said side flaps extend over lateral sides of the vehicle, and said end flaps extend over ends of the vehicle, said fastener being a snap having a first section coupled to said associated strap and a second section complementary to said first section, said second section of said snap being coupled to said associated side flap;

an inflation mechanism coupled to said chamber, said inflation mechanism being in fluid communication with an interior of said chamber wherein said inflation mechanism selectively inflates said chamber upon actuation of said inflation mechanism, said inflation mechanism comprising a tank, a conduit fluidly coupling said tank to said chamber, and a valve coupled between said tank and said chamber, said valve being openable such that said tank is in fluid communication with said chamber through said conduit wherein said tank is configured for releasing pressurized gas from said tank into said chamber;

a plurality of bands, each said band having a first end coupled to said chamber such that each said band is configured for extending across and being closed into an associated door opening of the vehicle whereby each said band couples said cover to the vehicle, a respective second end of each said band being couplable to an associated one of said side flaps; and a plurality of connectors, each said connector being coupled to a respective said band and said associated side flap wherein said second end of each said band is couplable to said associated side flap.

* * * * *